(12) United States Patent
Covell et al.

(10) Patent No.: US 8,184,953 B1
(45) Date of Patent: May 22, 2012

(54) SELECTION OF HASH LOOKUP KEYS FOR EFFICIENT RETRIEVAL

(75) Inventors: Michele Covell, Palo Alto, CA (US);
Sergey Ioffe, Mountain View, CA (US);
Shumeet Baluja, Santa Clara, CA (US);
David Marwood, San Leandro, CA (US)

(73) Assignee: Google Inc., Mountain View, CA (US)

( * ) Notice: Subject to any disclaimer, the term of this patent is extended or adjusted under 35 U.S.C. 154(b) by 729 days.

(21) Appl. No.: 12/391,153

(22) Filed: Feb. 23, 2009

Related U.S. Application Data

(60) Provisional application No. 61/030,925, filed on Feb. 22, 2008, provisional application No. 61/045,226, filed on Apr. 15, 2008.

(51) Int. Cl.
*H04N 9/80* (2006.01)

(52) U.S. Cl. ........ 386/248; 380/201; 382/209; 707/747; 725/18; 725/19

(58) Field of Classification Search ................... 380/201; 386/248; 707/2, 3, 104, 100, 101; 382/209
See application file for complete search history.

(56) References Cited

U.S. PATENT DOCUMENTS

| | | | | |
|---|---|---|---|---|
| 7,966,327 | B2 * | 6/2011 | Li et al. | 707/737 |
| 2006/0101060 | A1 * | 5/2006 | Li et al. | 707/102 |
| 2006/0271540 | A1 * | 11/2006 | Williams | 707/7 |
| 2006/0271947 | A1 | 11/2006 | Lienhart et al. | |
| 2007/0005556 | A1 * | 1/2007 | Ganti et al. | 707/1 |
| 2007/0038659 | A1 * | 2/2007 | Datar et al. | 707/101 |
| 2007/0124756 | A1 * | 5/2007 | Covell et al. | 725/18 |
| 2007/0136331 | A1 * | 6/2007 | Hasan et al. | 707/100 |
| 2007/0143778 | A1 * | 6/2007 | Covell et al. | 725/19 |
| 2007/0169179 | A1 * | 7/2007 | Narad | 726/4 |
| 2007/0282860 | A1 * | 12/2007 | Athineos et al. | 707/10 |
| 2008/0044016 | A1 * | 2/2008 | Henzinger | 380/201 |
| 2008/0052488 | A1 * | 2/2008 | Fritz et al. | 711/216 |
| 2008/0120282 | A1 * | 5/2008 | Liberty et al. | 707/4 |
| 2008/0313128 | A1 * | 12/2008 | Arasu et al. | 707/2 |
| 2009/0052784 | A1 | 2/2009 | Covell et al. | |
| 2010/0061587 | A1 * | 3/2010 | Gupta et al. | 382/100 |

OTHER PUBLICATIONS

Zixiang, Yang, "Efficient video identification based on locality sensitive hashing and triangle inequality", 2005.*
Rennes, Thomas "A Video fingerprint based on Visual Digest and Local Fingerprints", Oct. 2006.*
Baluja, S., et al., *Audio Fingerprinting: Combining Computer Vision & Data Stream Processing*, IEEE International Conference on Acoustics, Speech and Signal Processing (ICASSP 2007), Apr. 15-20, 2007, pp. II-213-II-216, vol. 2.
Baluja, S., et al., *Content Fingerprinting Using Wavelets*, 3$^{rd}$ European Conference on Visual Media Production, 2006, pp. 198-207.

(Continued)

*Primary Examiner* — Thai Tran
*Assistant Examiner* — Gary Gracia
(74) *Attorney, Agent, or Firm* — Fenwick & West LLP

(57) ABSTRACT

Videos are received and indexed based on fingerprints generated for the videos, using lookup keys which correspond to sub portions of the reference fingerprints. Specifically, a set of lookup keys is selected such that the number of reference fingerprints such that the clumping associated with the associated each of the lookup keys is minimized. Clumping occurs when a number of reference identifiers associated with a lookup key exceeds a maximum value.

21 Claims, 9 Drawing Sheets

OTHER PUBLICATIONS

Baluja, S., et al., "Permutation Grouping: Intelligent Hash Function Design for Audio & Image Retrieval," Proc. ICASSP, 2008, 8 pages.

Burges, C., et al., "Distortion Discriminant Analysis for Audio Fingerprinting," IEEE-PAMI, 2003, pp. 165-174, vol. 11, No. 3.

Casey, M., et al., "Song intersection by Approximate Nearest Neighbor Search," ISMIR, 2006, 6 pages.

Chow, C., et al., "Approximating Discrete Probability Distributions with Dependence Trees," IEEE Transactions on Information Theory, 1968, pp. 462-467, vol. IT-14, No. 3.

Chum, O., et al., *Scalable Near Identical Image and Shot Detection*, Conference on Image and Audio Video Retrieval, Proceedings of the $6^{th}$ ACM International Conference on Image and Video Retrieval, 2007, pp. 549-556, ACM. N.Y., USA.

Cohen, E., et al., *Finding Interesting Associations without Support Pruning*, IEEE Transactions on Knowledge and Data Engineering, 2001, pp. 64-78, vol. 13, Issue 1.

Covell, M., et al., *Known-Audio Detection Using Waveprint: Spectrogram Fingerprinting by Wavelet Hashing, International Conference on Acoustics*, Speech and Signal Processing (ICASSP-2007), 2007.

Fink, M., et al., "Social-and Interactive-TV Applications based on Ambient-Audio Identification," EuroITV 2006, 2006, 10 pages.

Gionis, A., et al., "Similarity search in high dimensions via hashing," in Proceedings of the $25^{th}$ VLDB Conference, 1999, pp. 518-529.

Haitsma, J., et al., "A Highly Robust Audio Fingerprinting System," ISMIR, 2002, 9 pages.

Jacobs, C., et al., *Fast Multiresolution Image Querying*, International Conference on Computer Graphics and Interactive Techniques, Proceedings of the $22^{nd}$ Annual Conference on Computer Graphics and Interactive Techniques, 1995, pp. 277-286, ACM, U.S.A.

Ke, Y., et al., "Computer Vision for Music Identification," IEEE Computer Society Conference on Computer Vision and Pattern Recognition, in CVPR, 2005, pp. 597-604.

Liu, T., et al., *Clustering Billions of Images with Large Scale Nearest Neighbor Search*, $8^{th}$ IEEE Workshop on Application of Computer Vision (WACV'07). Feb. 2007, pp. 28-34, U.S.A.

Moulin, P., et al., *Performance of Random Fingerprinting Codes Under Arbitrary Nonlinear Attacks*, IEEE International Conference on Acoustics Speech and Signal Processing, Apr. 2007, pp. II-157-II-160, vol. 2, Issue 15-20.

Myers, C.S., et al., "A comparative study of several dynamic time-warping algorithms for connected work recognition," The Bell System Technical Journal, 1981, pp. 1389-1409, vol. 60, No. 7.

Swaminathan, A., et al., *Robust and Secure Image Hashing*, IEEE Transactions on Information Forensics and Security, Jun. 2006, pp. 215-230, vol. 1, No. 2.

Viola, P., et al., "Robust Real-Time Object Detection," Second International Workshop on Statistical and Computational Theories of Vision-Modeling, Learning, Computing, and Sampling, ICCV, Jul. 13, 2001, pp. 1-25.

PCT International Search Report and Written Opinion, PCT/US2008/074105, Nov. 4, 2008, 9 Pages.

"Google Video" Google, 2006, 1 page, [online] [retrieved on Feb. 1, 2011] retrieved from the internet <URL:http://video.google.com/video_about.html>.

"Shazam," Shazam Entertainment Ltd., 2006, 2 pages, [online] [retrieved on Feb. 1, 2011] retrieved from the internet <URL:http://www.shazam.com/>.

"YouTube Fact Sheet" YouTube, 2005, 2 pages, [online] [retrieved on Feb. 1, 2011] URL:http://www.youtube.com/t/fact_sheet.

\* cited by examiner

REFERENCE INDEX

| LSH KEY | VIDEO@(OFFSET) |
|---|---|
| 65 22 A5 B1 | A@(0), C@(7, 142, 156, 253), D@(34, 42, 71, 123, 124, 125)... |
| B2 72 A5 1C | A@(1), B@(0), C@(1, 12, 14), D@(5), F@(10, 125, 124, 126, 127, ....) |
| 24 56 39 12 | B@(1) |
| ... | ... |
| A5 43 21 C2 | A@(1) |
| 00 00 00 0A | BL1 |
| 23 43 44 D2 | A@(0), B@(0), G@(34, 51, 111, 154, 155, 156, 157, 186, 192, 201, ...) |
| 11 34 55 56 | B@(1) |
| ... | ... |
| E1 42 53 22 | A@(0) |
| 55 21 98 A1 | A@(1) |
| 11 34 55 56 | B@(0) |
| 11 53 B4 CA | B@(0) |
| 00 00 00 0B | BL2 (G, 26) |
| ... | ... |

BAND 0 / BAND 1 / BAND 2

SELECTION OF HASH LOOKUP KEYS FOR EFFICIENT RETRIEVAL

RELATED APPLICATIONS

This application claims the benefit under 35 U.S.C §119(e) of provisional patent application 61/030,925 filed Feb. 22, 2008, and provisional patent application 61/045,226 filed Apr. 15, 2008, the entirety of each of which is incorporated by reference herein.

BACKGROUND

1. Field of Art

The invention generally relates to an indexing system and more specifically to improving the efficiency of lookup and retrieval of videos from a stored index.

2. Description of the Related Art

Online video hosting services may contain thousands or millions of video files, making management of these libraries an extremely challenging task. The challenges become particularly significant in the case of online video hosting services where many users can upload video content for viewing by others. In order to provide efficient management of video hosting services, search engines have been developed to enable a user to determine whether an input item of video content matches reference video content in a large video database.

To facilitate searching of the large video database, the reference videos may be indexed into a searchable reference index of lookup keys generated based on the reference videos. Each lookup key in the index is associated with a set of reference videos which contain data corresponding to the lookup key. When an input video is received by a search engine, a set of lookup keys are generated for the input video and used to search the index in order to identify reference videos (or portions of reference videos) that have characteristics in common with the input video. Based on the retrieved information, one or more reference videos (or portions of reference videos) can be matched to the input video.

Problems in the efficiency of this matching occur when an index lookup performed by the search engine returns a very large list of reference videos associated with a particular lookup key. "Clumping" is a statistical term used to describe an instance in which a lookup key is associated with a number of reference videos which is significantly larger than the number of reference videos associated with the other keys in the reference index or a threshold value defined, for example, by an administrator of a system. Clumping is caused by a non-uniform distribution of the number of reference videos associated with the set of lookup keys. Clumping occurs when a key is generated based on data that is associated with a large number of the indexed items, for example data which contains a feature that is commonly found in the population of indexed items. For example, a lookup key generated based on a portion of a reference video which shows an image or soundtrack will create clumping if the image or soundtrack is prevalent in the population of reference videos being searched. Accordingly, instances of clumping associated with lookup keys are specific to the population of indexed items. An "amount of clumping", as used herein, refers to the relative number of reference identifiers associated with the lookup key or a set of lookup keys. A lookup key that is associated with a large number of reference identifiers is associated with a large amount of clumping and a lookup that that is associated with a small number of reference identifiers is associated with a small amount of clumping.

As multiple index lookups are necessary to retrieve a matching item, if several lookup keys associated with an input video will produce large lists of matching results, a very large list of matching results may be created. In such a situation, the system may be unable to handle the large data flow of matching results due to constraints such as processing power, required retrieval times, memory, or network bandwidth. Due to these limitations, an efficient lookup and retrieval system that minimizes clumping while maintaining the accuracy of the matching process is needed.

SUMMARY

A system, method and computer program product indexes a set of reference videos using a reference index which is generated based on training reference videos which represent the population of videos being indexed. Reference fingerprints are received for the set of training reference videos and partitioned into bands, so that each band is associated with a respective portion of the fingerprint called a lookup key. A training index stores, for each band, all the lookup keys associated with the band, and for each lookup key in the band, there is stored a list of reference identifiers for the videos from which the fingerprints are generated. A subset of the lookup keys is then selected based on a selection algorithm and a reward function. The selection algorithm iteratively evaluates subset of keys based on a reward function which is used to assess the goodness of the subset of keys. The goodness of the subset of keys is typically based on the clumping associated with each key (i.e. number of reference identifiers) in the set of lookup keys but can also be based on other factors such as the information value of the lookup keys. A reference index is generated based on the selected subset of keys.

The selected subset of keys is further evaluated to determine a likelihood of clumping associated with each key in the subset of keys. Split lookup keys are generated for lookup keys which are associated with a high likelihood of clumping. Split lookup keys are generated by extending the number of data elements in the band which corresponds to the lookup key based on the reference fingerprints the band was generated from. Data indicating the split lookup keys is stored in association with the reference index. Once the reference index is generated, the system continues to receive reference identifiers for reference videos and associate the reference identifiers with the lookup keys in the reference index. If the number of reference identifiers associated with a lookup key exceeds a predefined threshold value (i.e. clumping has occurred), split lookup key data for the lookup key may be retrieved. The reference identifiers previously associated with the lookup key are then re-indexed in association with the split lookup keys (i.e. "split" over the split lookup keys), causing the number of reference identifiers associated with the each of the split lookup keys to be significantly less than the number of reference identifiers which caused the occurrence of clumping.

After the reference index has been created, the reference index may be used to efficiently match input videos with the set of reference videos. As the number of reference identifiers associated with each lookup key will not exceed a maximum number (i.e. have clumping), this enables the system to perform many searches without retrieving a large list of results. This is particularly beneficial in identifying best matches for videos which are highly similar.

The features and advantages described in the specification are not all inclusive and, in particular, many additional features and advantages will be apparent to one of ordinary skill in the art in view of the drawings, specification, and claims.

Moreover, it should be noted that the language used in the specification has been principally selected for readability and instructional purposes, and may not have been selected to delineate or circumscribe the inventive subject matter.

BRIEF DESCRIPTION OF THE FIGURES

FIG. 3 illustrates an example of a reference video index according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A system, method, and computer program product improves the efficiency of lookup and retrieval by identifying a set of lookup keys that minimize clumping associated with lookup keys within a reference index based on a representative set of training reference data. It is noted that, although specific examples are provided in the context of indexing video content, the described system and method can be used for other types of media content indexing such as audio, images, etc. Furthermore, the indexing and lookup techniques described below can be extended to types of indices other than those used for matching media content such as, for example, document indices or web indices.

System Architecture

Figure 1:
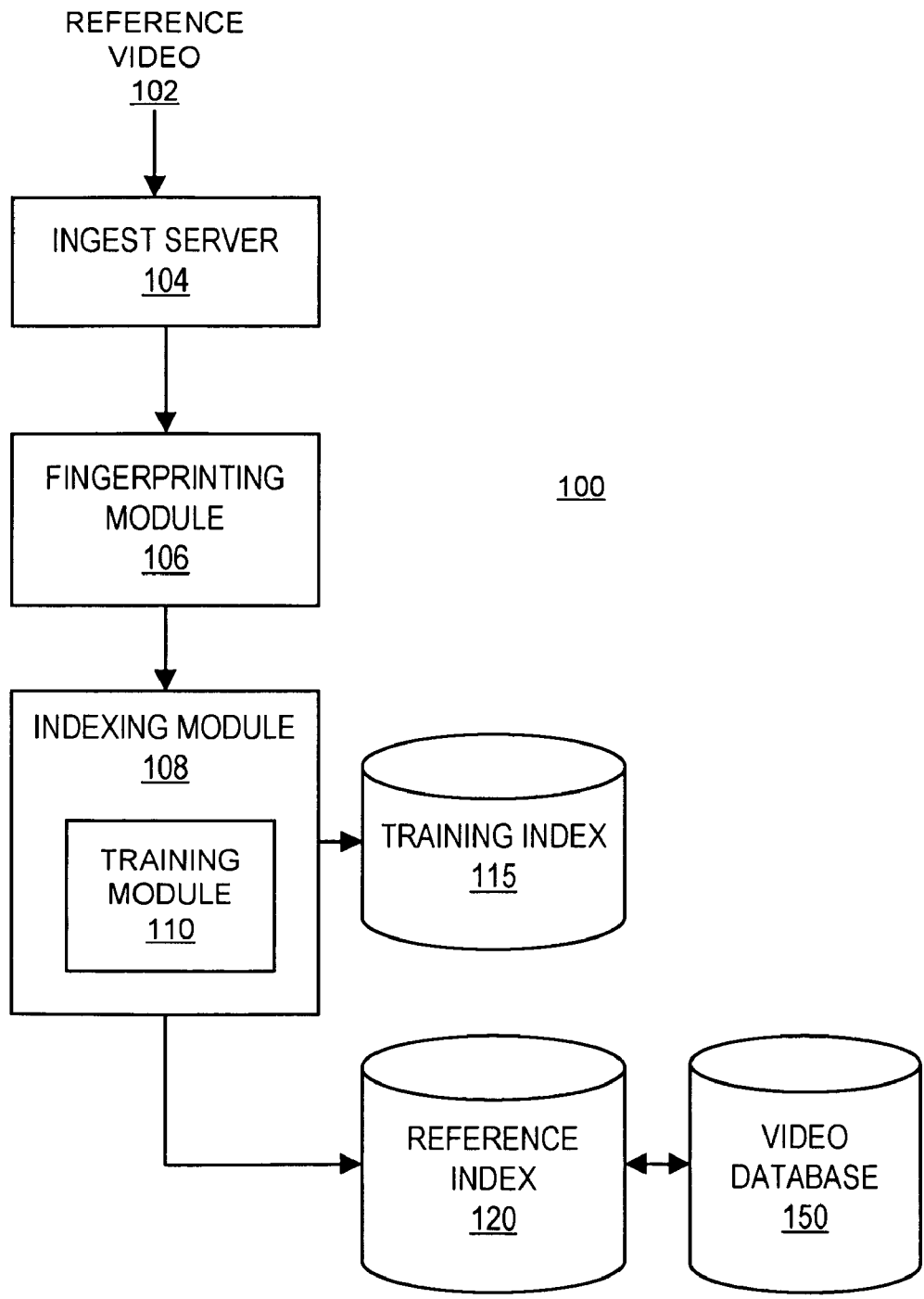
FIG. 1 illustrates an embodiment of a system for generating a reference video index according to one embodiment.

An embodiment of a computer system 100 for indexing video content is illustrated in FIG. 1. The computer system 100 comprises a memory which stores an ingest server 104, a fingerprinting module 106, an indexing module 108, a training index 115, a reference index 120 and a video database 150. The computer system 100 further comprises a processor for executing executable program code associated with the ingest server 104, the fingerprinting module 106, the indexing module 108, the training index 115, the reference index 120 and the video database 150. An ingest server 104 receives a reference video 102 from a video source. The video source can be, for example, a client computer that communicates with the ingest server 104 through a network. Alternatively, the video source can be a database or other storage device communicatively coupled to the ingest server 104. For example, the video source can be a video storage medium such as a DVD, CD-ROM, Digital Video Recorder (DVR), hard drive, Flash memory, or other memory. The ingest server 104 may also be communicatively coupled to a video capture system such as a video camera, to receive video content. In practice, there will be numerous video sources, and the ingest server 104 will receive many reference videos (e.g., potentially thousands or millions) for processing.

The fingerprinting module 106 receives the reference video 102 from the ingest server 104 and generates one or more "fingerprints" representing the reference video 102. The fingerprint is a vector of alphanumeric data elements (e.g., bits, real numbers, etc.) representing, for example, the visual-spatial, visual-temporal, and/or structural characteristics of some or all of the video in a compact format. Methods for generating fingerprints are well known in the art, and the particular method used it not limited by the invention. Examples of suitable fingerprinting methods include the MD5, SHA-1, min Hashing, random projection hashing and other one-way hash functions. In some embodiments, the fingerprinting method applies a wavelet transform such as a Haar-Wavelet transform to the video data. Given that a video is a real world entity, a fingerprint is data that represents real world characteristics of a video. The fingerprint represents a video based on its visual content such that minor variations due to compression, de-compression, noise, frame rate, start and stop time, source resolutions and so on do not significantly affect the fingerprint. In one embodiment, a fingerprint is generated for a specific time-localized segment of the reference video 102, for example a 0.25 second segment of video starting at 1:00.00 and ending at 1:00.25. The segments for which fingerprints are generated can be continuous (e.g., one fingerprint for every 0.25 seconds of video) or discontinuous (e.g., every 5 seconds, a fingerprint for a 0.25 segment of video).

Figure 2:
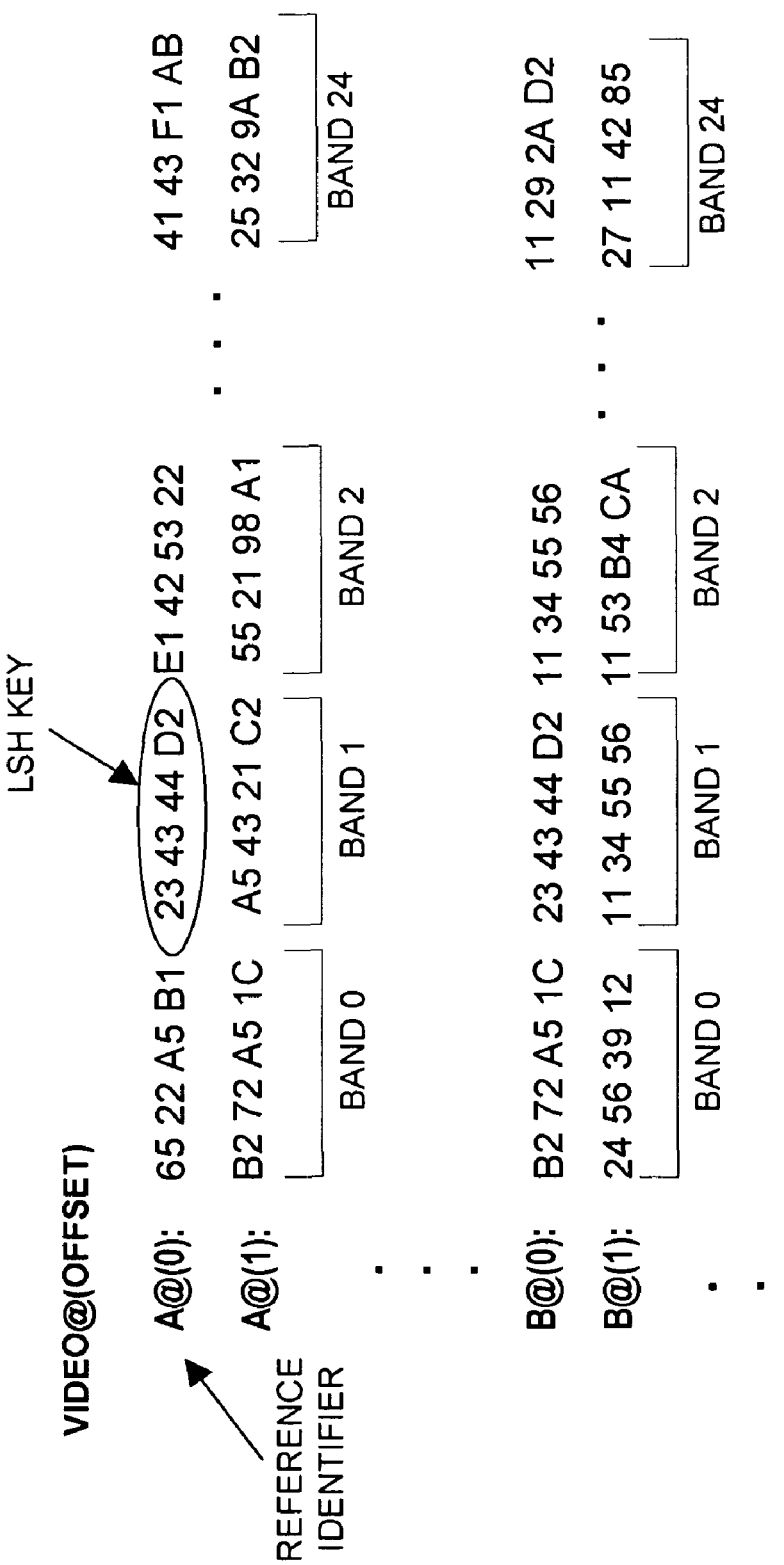
FIG. 2 illustrates examples of reference fingerprints that are indexed according to a Locality Sensitive Hashing process according to one embodiment.

The data elements within the fingerprints are partitioned into bands corresponding to a set of elements which comprise "lookup keys." Each ordered position within a band is referred to as a "dimension". Each lookup key comprises a set of data element values which correspond to the data elements within the different dimensions of the band. Each band (and its corresponding fingerprint) is identified by a reference identifier identifying the video and an offset into the video of the band. The offset can be a time offset for the beginning time value of the band, or an index number indicating a position in the sequence of bands. For example, a band and its corresponding fingerprint can be represented using the notation X@(Y), where X is the identifier of a video, and Y is an offset index, and where Y is a time offset or a position offset. Examples of reference fingerprints and lookup keys are illustrated in FIG. 2 and described in further detail below.

An indexing module 108 generates a reference index 120 based on the reference identifiers received from the fingerprinting module 106. The indexing module 108 indexes a reference identifier for each reference fingerprint in association with number of lookup keys, with one lookup key per band. Thus, if there are twenty bands, a given fingerprint yields twenty corresponding lookup keys. Because of the nature of lookup keys, a given lookup key value can be associated with a large number of different fingerprints, and video segments. Indexing the reference fingerprints based on lookup keys thus provides an efficient mechanism for finding and retrieving a particular fingerprint (or corresponding video segment) based on characteristics of the fingerprint. An example of a reference index 120 is illustrated in FIG. 3 and discussed in detail below. The reference index 120 is coupled to a video database 150 where the reference videos 102 are stored once they have been indexed.

Once the reference index has been generated, the indexing module 108 continues to receive reference fingerprints and index the reference fingerprints based on lookup keys stored in the reference index 120. As indexing module 108 continues to index the reference identifiers, the number of reference identifiers or "bin size" associated with one or more of the lookup keys may grow too large, causing clumping. The indexing module 108 functions to identify instances of clumping by determining whether the number of reference identifiers associated with a lookup key (bin size) exceeds a threshold value. Identification of clumping and indexing reference keys is described in detail below with reference to FIG. 7.

The indexing module 108 comprises a training module 110 used to select a set of lookup keys for use as the reference index 120 based on a training set of reference videos 102. The training set of reference videos 102 is selected such that they are representative of the population of video content received by the ingest server 104 as reference videos 102 and/or as input videos for searches. Input videos for searches are discussed in detail below with regards to FIG. 8. The training module 110 generates a training index 115 based on a set of training reference fingerprints generated by the fingerprinting module 106. The training module 110 selects a subset of lookup keys from the training index 115 for use as the reference index 120. In an alternative embodiment, the indexing module 108 may receive training reference fingerprints for indexing from an external source other than the fingerprint module 106 (e.g., a fingerprint database).

The training module 110 selects the subsets of lookup keys using one or more evaluation metrics to evaluate the likelihood (i.e., a measure of probability) that a lookup key will cause clumping and/or one or more reward functions used to evaluate a degree of "clumping" associated with a specific subset of lookup keys (i.e. the number of lookup keys which are associated with long lists of reference identifiers). In some instances, the reward function is based on and/or specific to the evaluation metric. The evaluation metrics and/or reward functions used to evaluate clumping may be selected according to system requirements and the population statistics of the representative training data used. For instance, a reward function used to evaluate clumping associated with a subset of lookup keys may evaluate the subset of keys according to a threshold value which specifies a degree of clumping that is allowable based on system requirements such as a threshold number of reference identifiers with which a lookup key can be associated.

In some embodiments, the evaluation metrics and/or reward functions evaluate clumping based on the distribution of lookup keys. Generally, the evaluation metrics and/or reward functions evaluate whether the distribution of some or all of the lookup keys approximates an independent and identical distribution. For a set of lookup keys to have an independent and identical distribution, the data elements value corresponding to the different lookup keys must have a same probability of being observed in a set of video content and none of the lookup keys must be inter-dependent. This type of distribution reduces clumping as each lookup key is associated with a similar number of reference videos 102. An independent and identical distribution is also beneficial in maximizing the efficiency of lookups by reducing redundancy in the set of lookup keys caused by inter-dependencies in the data.

In some embodiments, evaluation metrics and reward functions based on information theory metrics such as entropy and mutual information are used to evaluate clumping by assessing the information value of the lookup keys based on the data element values of the lookup keys. Entropy is an information theory metric used to quantify the uncertainty associated with a variable. In one embodiment, Shannon entropy is used as a measure of the average information content one is missing when one does not know the data element values of the lookup keys. By identifying the information content specific to a set of lookup keys, a subset of lookup keys associated with a maximum amount of information content may be selected for use as the reference index. Mutual information is a metric used to quantify the amount by which uncertainty associated with one variable is reduced given another variable. By identifying a high degree of the mutual information associated with the lookup keys, redundant or interrelated lookup keys may be removed from the set of lookup keys used a reference index 120.

Using a set of training reference videos 102 allows for the evaluation of clumping based on the population statistics of data which is representative of both the reference videos 102 being indexed and the input videos used for searches which represent the data encountered by the system. This approach allows for the selection of a set of lookup keys with reduced or minimal clumping based on likelihoods of clumping which are specific to the population of video content encountered by the system 100.

This approach further allows for the determination of lookup keys that are likely to cause clumping as the system indexes additional reference video content in the reference index 120. By determining the lookup keys likely to be associated with clumping, approaches to reduce clumping such as extending or "splitting" the lookup keys in the reference index 120 may be used to avoid clumping when indexing reference data. Further, identification of lookup keys associated with a high likelihood of clumping allows for the allocation of disk space associated with the reference index 120 such that space is made available for additional lookup keys which may be generated from splitting the keys with a high likelihood of causing clumping.

In one embodiment, the reference fingerprints are indexed into the reference index 120 using a Locality Sensitive Hashing (LSH) process. FIG. 2 illustrates examples of reference fingerprints for indexing according to an LSH process. Each fingerprint is referenced by a reference identifier indicating the corresponding reference video and segment represented by the fingerprint. For example, fingerprint A@(0) identifies a fingerprint representing the segment of video A at an offset index 0, A@(1) identifies a fingerprint representing the segment of video A at an offset index of 1 (i.e. segment 1), and so on. Each fingerprint comprises a sequence of data element values (e.g., 100 byte values per fingerprint). The sequence of data element values is divided into a number of LSH bands (band 0, band 1, etc.) with each band corresponding to a subset of data element values in the fingerprint. For example, LSH band 0 comprises the first four data element values of the fingerprint; LSH band 1 comprises the next four data element values of the fingerprint, and so on. In one embodiment, the indexing module 108 divides the fingerprints into 25 LSH bands with each band comprising four byte values. The set of data element values within a given LSH band is referred to as a "lookup key." For example, fingerprint A@(0) contains the key (23, 43, 44, D2) in LSH band 1. Note that keys in different LSH bands are considered to be unique keys, even if they contain identical data element values.

Reference Index

FIG. 3 illustrates an embodiment of a reference index 120 that stores sets of reference identifiers in LSH "bins" based on the lookup keys contained in the respective fingerprints identified by the reference identifiers. In a given LSH band, each unique fingerprint key in that band is associated with a different bin in the reference index 120. For example, in FIG. 3, band 0 has three bins, one each for lookup keys "65 22 A5 B1", "B2 72 A5 1C", and "24 56 39 12"; band 1 has four bins for its keys, and band 2 has five bins.

Each bin stores all reference identifiers corresponding to the fingerprints that contain the key in the band associated with that bin. Thus, in band 0, the bin for the key "65 22 A5 B1" indicates that this key is found in band 0 of the fingerprints A@(0), C@(7), C@(142), C@(156), and so on. Note that keys in different bands have separate bins (and are considered different keys) even if the keys contain identical values. For example, the lookup key 302 in band 1 having data element values "11 34 55 56" has a separate bin from the key 304 in band 2, even though the keys have the identical data element values.

Figure 4:
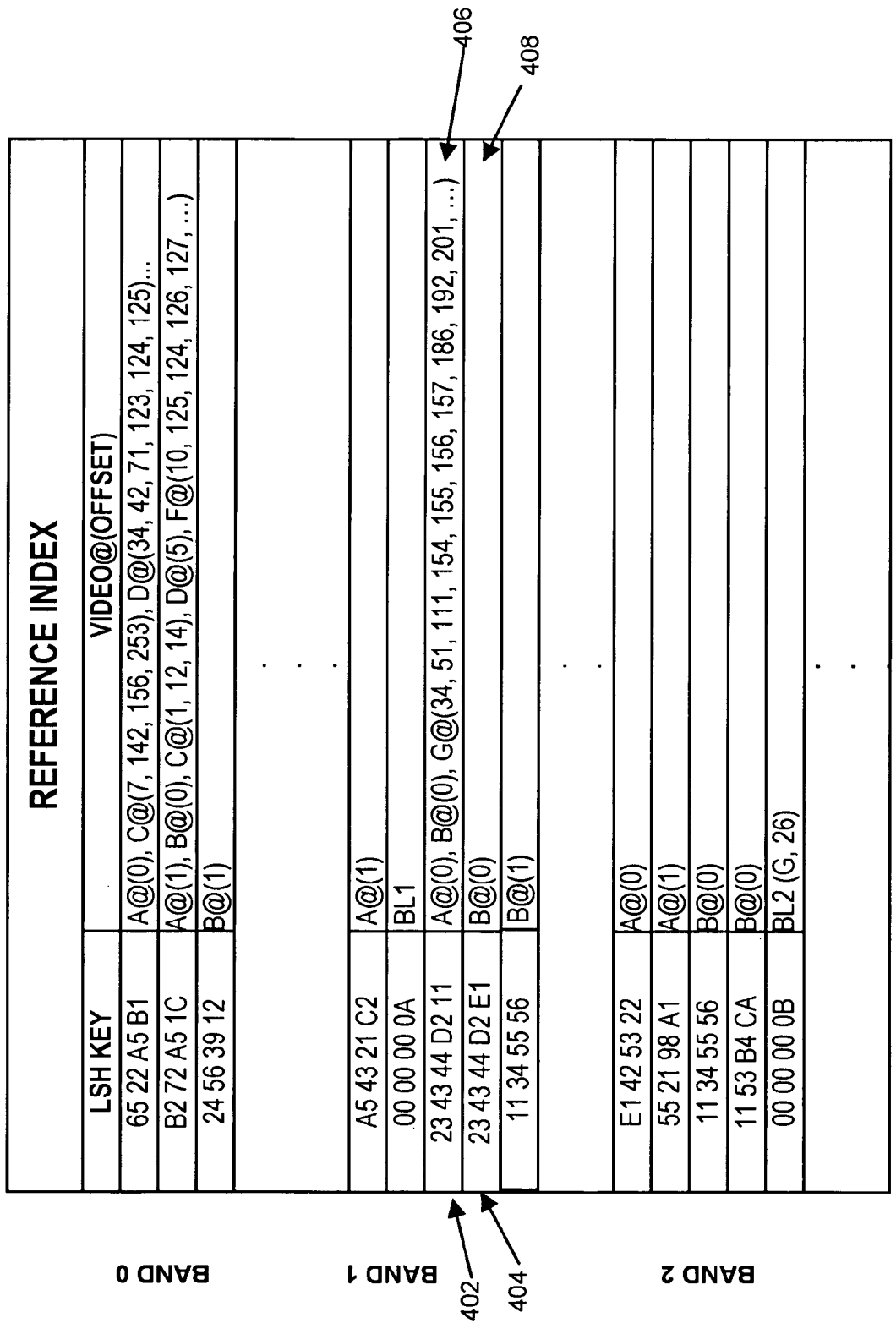
FIG. 4 illustrates an example of a reference video index comprising split lookup keys according to one embodiment.

If the number of reference identifiers in a bin (i.e., the bin size) exceeds a pre-defined number, clumping can occur. In order to eliminate clumping lookup keys may be "split" by extending the lookup keys to include additional data element value from subsequent bands. FIG. 4 illustrates an embodiment of a reference index 120 that stores sets of reference identifiers in LSH bins based corresponding to lookup keys which have been split due to clumping. Using the examples illustrated in FIGS. 2 and 3, the lookup key "23 53 44 D2" corresponding to band 2 and reference identifiers A@(0) and B@(0), illustrated in FIGS. 2 and 3 may be extended to comprise additional data element values from the subsequent band in the reference fingerprint (band 3). This will create two new "split" lookup keys: "23 53 44 D2 11" which is specific to A@(0) and "23 53 44 D2 E1" which is specific to B@(0), where the data element "11" is used to extend the key in A@0, and the data element "E1" is used to extend the key in B@0. Accordingly, new entries in the reference index 902, 904 will be created for the split lookup keys and the corresponding reference identifiers A@0 and B@0 will be stored in the respective bins 406 and 408 corresponding to the split lookup keys.

Figure 5:
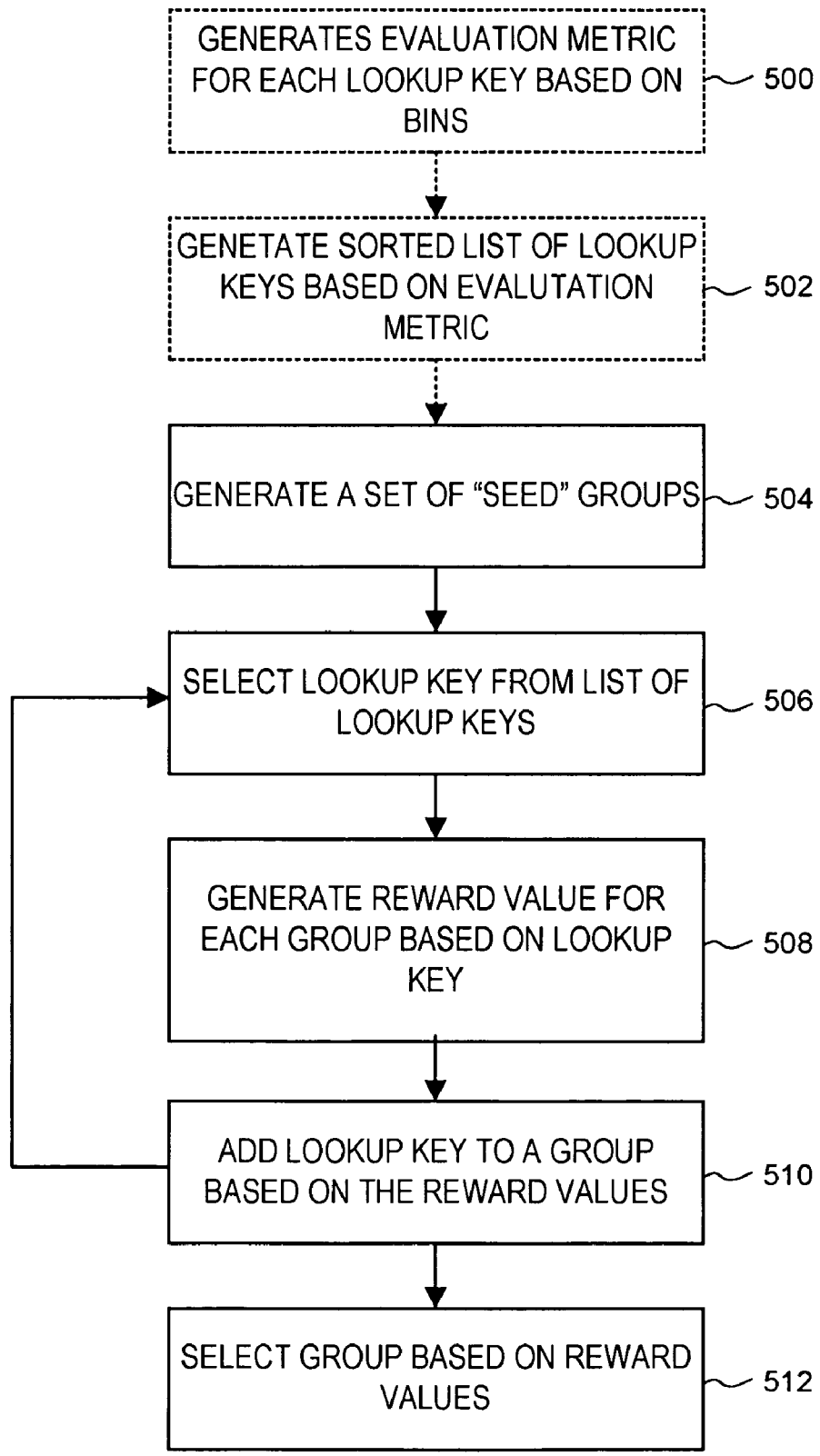
FIG. 5 illustrates steps performed by the training module 110 to generate the reference index 120 according to one embodiment.

FIG. 5 illustrates steps performed by the training module 110 to generate the reference index 120 according to one embodiment. Other embodiments perform the illustrated steps in different orders, and/or perform different or additional steps. Moreover, some of the steps can be performed by engines or modules other than the training module 110.

The training module 110 receives 502 a set of reference fingerprints, each reference fingerprint representing a time-localized segment from a reference video. The training module 110 partitions the reference fingerprints into bands in order to identify 504 a set of lookup keys that correspond to bands contained within the set of reference fingerprints. Each lookup key is associated with a bin in the training index 115 which stores reference identifiers which identify the reference fingerprints in which the key is contained.

The training module 110 selects 508 a subset of the identified lookup keys in the training index 115 based on a selection algorithm. The selection algorithm is a heuristic-based algorithm which seeks to select an optimal subset of lookup keys for use as a reference index 120 without searching the entire search space of combinations of lookup keys. The optimal subset of the lookup keys can be defined in different ways based on the reward function used to assess the relative goodness of the different subsets of the lookup keys generated based on the selection algorithm. The goodness of the subset of lookup keys is based on the amount of clumping associated with the lookup key and information which indicates whether the lookup keys can be used to represent a majority of the reference identifiers such as the mutual information or entropy associated with the subset of lookup keys. According to one embodiment, the reward function used to evaluate the goodness of the subset of lookup keys can evaluate the amount of redundancy associated with a subset of the lookup keys (i.e. the mutual information associated with the subset of keys), a number of videos represented by the subset of lookup keys in the group, an information content value associated with a subset of the lookup keys and/or the amount of inter-dependency between lookup keys within the subset of the lookup keys, or any combination thereof.

The selection algorithm iteratively generates groups or subsets of the set of lookup keys in the training index 115, evaluates the groups of lookup keys using a reward function and selects the group of lookup keys associated with the smallest likelihood of causing clumping.

In one embodiment, the reward function evaluates the amount of clumping associated with a subset of lookup keys by determining an occupancy metric for the subset of lookup keys ($h_1, h_2, h_3, h_4 \ldots h_k$). The occupancy metric associated with the subset of lookup keys ($h_1, h_2, h_3, h_4 \ldots h_k$) is calculated based on the number of reference identifiers associated with the subset of lookup keys which reference unique videos. For example, the lookup key "65 22 A5 B1" associated with Band 0 in FIG. 3 is associated with videos A, C and D. The lookup key "B2 72 A5 1C" associated with Band 0 in FIG. 3 is associated with videos A, B, C, D and F. Therefore, the lookup keys "65 22 A5 B1" and "B2 72 A5 1C" are associated with 5 unique videos (A, B, C, D and F). In a specific embodiment the occupancy metric is calculated according to the following formula: occupancy ($h_1, h_2, h_3, h_4 \ldots h_k$)=number of unique videos having keys ($h_1, h_2, h_3, h_4 \ldots h_k$)

In another embodiment, the reward function evaluates an amount of clumping associated with a subset of lookup keys by determining a probability metric which specifies the likelihood of observing the lookup keys in a reference video in a population of reference videos. In a specific embodiment, the probability metric is equal to the occupancy metric divided by the number of videos (N) in the population, and is calculated according to the following formula: probability ($h_1, h_2, h_3, h_4 \ldots h_k$)=number of unique videos having keys ($h_1, h_2, h_3, h_4 \ldots h_k$)/N In another embodiment, the reward function evaluates an amount of clumping associated with a subset of lookup keys by determining an entropy metric which specifies the information value of the subset of keys. The entropy H associated with a subset of lookup keys ($h_1, h_2, h_3, h_4 \ldots h_k$) is calculated based on the probability of observing the data elements values ($v_1, v_2 \ldots v_k$) associated with each lookup key ($h_x$). Using the above example, to determine the entropy H("65 22 A5 B1") associated with a single lookup key $h_x$, a probability of observing each data element value ("65", "22", "A5" and "B1") corresponding to the 4 different dimensions of a band is determined based on the number of times where the data element values ("65", "22", "A5" and "B1") are observed in the videos indexed in association with the band:

$$H(h_x) = -\sum_{i=1}^{k}(p(v_i) * \log p(v_i))$$

The entropy associated with a subset of lookup keys H($h_1, h_2, h_3, h_4 \ldots h_k$) is similarly calculated by generating entropy values based on the data element values associated with the subset lookup keys each dimension of the band and summing the entropy values. For example, given a subset of lookup keys with values "65 22 A5 B3", "65 22 A5 B1" and "B2 72 A5 1C", the entropy of the subset of lookup keys would be the sum of the entropies calculated for the data element values (65, 65, B2), (22, 22, 72), (A5, A5, A5) and (B3, B1, 1C). The entropies are calculated according to the formula below where the number of the dimensions is equal to k and the lookup keys h are associated with data element values which correspond to the index of the lookup key (i.e. $h_1 = \{v1_1, v1_2, v1_3 \ldots v1_k\}$):

$$H(h_1, h_2, h_3, h_4 \ldots h_k) = -\sum_{i=1}^{k} p(v1_i, v2_i, v3_i, v4_i \ldots vk_i) * \log p(v1_i, v2_i, v3_i, v4_i \ldots vk_i)$$

The reward function can also be based on the mutual information associated with the subset of lookup keys. In a specific embodiment, the reward value is based on the sum of pairwise mutual information values for all lookup keys in the subset of lookup keys. The mutual information for a pair of keys $h_x$ and $h_y$ is based on the entropy associated with the individual keys ($H(h_x)$, $H(h_y)$) and the joint entropy between the keys $H(h_x, h_y)$ and is calculated according to the formula:

$$MI(h_x, h_y) = H(h_x) + H(h_y) - H(h_x, h_y)$$

$$\text{where } H(h_x, h_y) = -\sum_{i=1}^{k} p(vx_i, vy_i) \log p(vx_i, vy_i)$$

In one embodiment, the training module 115 iteratively generates a set of groups of lookup keys by iteratively selecting a lookup key from the set of lookup keys and adding the lookup keys to a group of the set of groups based on a reward function. Suitable algorithms for performing this method include greedy algorithms such as simulated annealing, cost effective lazy-forward selection (CELF), backpack algorithms, stochastic hill climbing, Tabu search and bin packing approximation algorithms. This embodiment is discussed in detail below with respect to FIG. 6. In another embodiment, the training module 110 uses a permutation function to iteratively generate different groups comprising different permutations of the lookup keys and evaluate the groups according to a reward function. Suitable algorithms for performing this method include: genetic algorithms, permutation-based algorithms, expectation maximization, simulated annealing, generate-and-test stochastic hill climbing and probabilistic-model-based optimization algorithms. This embodiment is discussed in detail below with respect to FIG. 7.

The training module 110 identifies 510 one or more lookup keys in the selected group of keys that are likely to cause clumping based on an evaluation metric. The evaluation metric is used to assess an amount of clumping associated with the lookup key. The evaluation metric can be any type of metric which indicates the likelihood that a number of reference identifiers associated with the lookup key will exceed a defined value, causing clumping. In one embodiment, the evaluation metric may simply be based on the occupancy metric associated with the lookup key. In another embodiment, the evaluation metric may be based on a probability metric associated with the key.

In some embodiments, the evaluation metric may also be based on the entropy, the mutual information, and/or histogram/distribution data associated with the lookup keys. The training module 110 identifies 410 one or more lookup keys in the group of keys with evaluation metrics which indicate that the lookup key is associated with an evaluation metric which exceeds a pre-defined threshold value specified by a system administrator to indicate a large amount of clumping. The specified value is highly dependent on the specific system resources. For example, the training module 110 may identify that an occupancy value exceeds a pre-defined value ranging from 4-10 times an average occupancy of the subset of lookup keys.

The training module 110 generates 512 "split" lookup keys for the lookup keys that are likely to cause clumping. The training module 110 generates split lookup keys by extending the number of data elements in the band corresponding to the lookup key to create one or more lookup keys which are associated with a length that is greater than the length of the original lookup key. Because of the greater length associated with the split lookup keys, different subsets of the set of reference identifiers in the bin associated with the original lookup key will be associated with different split lookup keys after the original lookup key is split. In other words, the reference identifiers will be "split" over the newly generated split lookup keys, thereby eliminating clumping due to a bin containing a large number of reference identifiers associated with the lookup key. The training module 110 stores data indicating the split lookup keys and associated reference identifiers for future usage. For example, the training module 110 may determine that the lookup key "65 22 A5 B1" has split lookup keys "65 22 A5 B1 23" and "65 22 A5 B1 E1" respectively associated with reference identifiers "A@(0), C@(7, 142, 156, 253), D@(34, 42, 71)" and "G@(1, 5, 9), E@(0, 12, 768)" and stored this information in associated with the reference index 102 for usage in the event that the number of reference identifiers associated with the lookup key "65 22 A5 B1" exceeds a pre-defined value (i.e. clumping has occurred).

The training module 110 generates 514 a reference index 120 based on the selected group of lookup keys. The training module 110 generates 514 the reference index 120 by allocating memory to store the selected group of lookup keys in association with memory used to store bins of reference identifiers. In some embodiments, the training module 110 allocates memory associated with the lookup keys based on the likelihood of clumping associated with the lookup keys. In these embodiments, the training module 110 allocates additional memory in disk space which is proximate (e.g. within the same block of memory) to the memory used to store a lookup key with high likelihood of causing clumping. This additional memory is used to store the split lookup keys associated with the lookup keys and their associated bins, in the event that the bin associated with the lookup key has a number of reference identifiers which exceeds a specified value.

Selection of Lookup Keys for Training Reference Index

Figure 6:
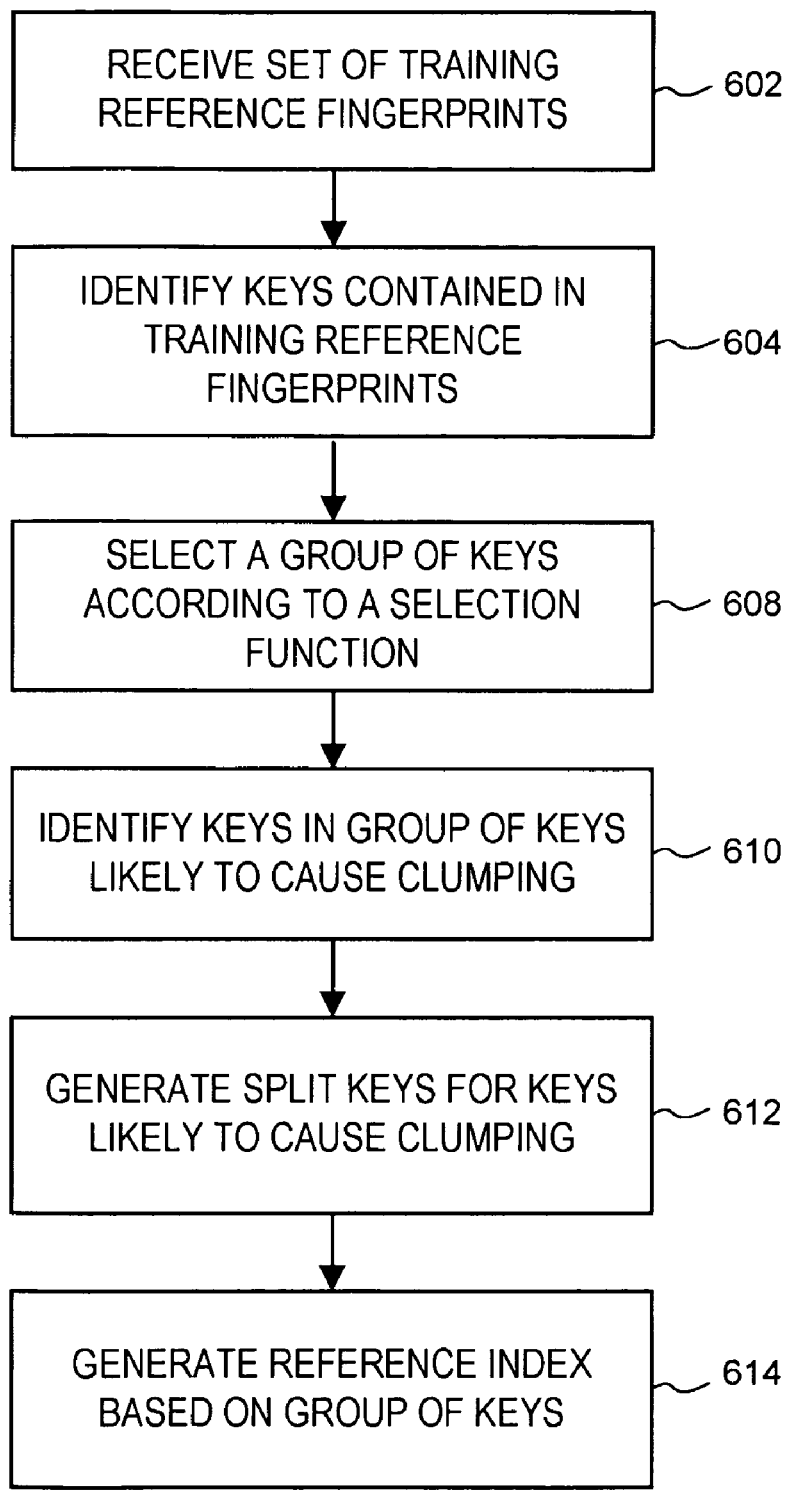
FIG. 6 illustrates detailed steps performed by the training module 110 to select a subset of lookup keys according to one embodiment.

FIG. 6 illustrates detailed steps performed by the training module 110 to select a group of lookup keys based on the training index 115 to generate the reference index according to one embodiment. Other embodiments perform the illustrated steps in different orders, and/or perform different or additional steps. Moreover, some of the steps can be performed by engines or modules other than the training module 110.

In some embodiments, the training module 110 generates 600 an evaluation metric for each lookup key in the training index 115 based on the reference identifiers stored in the bins associated with the reference keys, wherein the evaluation metric indicates the likelihood that the lookup key will cause clumping. In these embodiments, the training module 110 generates 602 a sorted list of lookup keys based on the evaluation metrics associated with the lookup keys, where the list is sorted according to the likelihood that they will cause clumping indicated by the evaluation metrics associated with the lookup keys.

The training module 110 generates 604 a set of one or more "seed" groups, where each seed group contains one or more of the lookup keys. In one embodiment, the training module 110 generates 604 the seed groups by randomly selecting lookup keys from the training index 115. The training module 110 selects 606 a lookup key from a list of lookup keys. In embodiments where the list is a sorted list, the training module 110 selects lookup key from the list such that the lookup key is associated with an evaluation metric which indicates a smallest likelihood of causing clumping and the lookup key has not been previously selected. For example, if the evaluation metric corresponds to the entropy of the lookup key given it's reference identifiers and the lookup keys are sorted by their associated entropy values, the training module 110 may select and add the lookup key with the highest or lowest entropy value. In this embodiment, the lookup keys associated with the highest or lowest entropy values may be selected based on the distribution of entropy values associated with the lookup keys. In some embodiments, the training module 110 may generate 604 a multiple sets of seed groups using both the highest and lowest entropy values and select multiple groups of lookup keys according to the method described below.

Using the reward function, the training module 110 generates 608 a reward value based on the selected lookup key and information associated with the lookup keys which have been previously added to each group such as the reference identifiers associated with the lookup keys which have been previously added to each group. In this embodiment, the training module 110 uses the reward function to generate 608 values which represent the goodness of each group of lookup keys with and without the addition of the selected lookup key. Based on these values, the training module 110 generates 608 the reward value which represents a benefit associated with adding the lookup key to the group. According to the embodiment, the reward value can represent, an amount of clumping associated with adding the lookup key to the group, a number of videos represented by lookup keys in the group associated with adding the lookup key to the group, an increase or decrease in information content value associated with adding the lookup key to the group, an amount of redundancy associated with adding the lookup key to the group, an amount of inter-dependency associated with adding the lookup key to the group, or any combination thereof. For example, the training module 110 may generate 608 a reward value which represents the entropy of the group with the addition of the selected lookup key, the occupancy of the group with the addition of the selected lookup key or the probability associated with the group with the addition of the selected lookup key. The training module 110 may generate 608 a reward value by generating pair-wise mutual information metrics between the lookup keys in the group and the selected lookup key.

The training module 110 adds 610 the selected lookup key to a group of the set of groups associated with a reward values indicating with a maximum benefit associated with adding the selected lookup key. According to the embodiment and the reward function used, the training module 110 may add the selected lookup key to a group based on a reward value which indicates a minimum degree of inter-dependency associated with adding the selected lookup key to the group, a maximum increase in information value associated with adding the selected lookup key to the group, a minimal amount of clumping associated with adding the selected lookup key to the group, a minimum amount of redundancy associated with adding the selected lookup key to the group or any combination thereof. Using the examples above, the training module 110 may select to add the lookup key to a group associated with a reward value which indicates the maximum entropy obtained by adding the lookup key to the group. The training module 110 may select to add the lookup key to a group associated with a reward value which indicates a minimum increase in mutual information associated with adding the lookup key to the group. According to the embodiment, the lookup key may be added to the group associated with a minimum sum of the pair-wise mutual information values between the selected lookup key and the lookup keys in the group, the minimum pair-wise mutual information metric between the selected lookup key and the lookup keys in the group or the minimum maximal pair-wise mutual information metric between the selected lookup key and the lookup keys in the group.

The training module 110 repeats the process of selecting 606 lookup keys, generating 608 reward values and adding 610 lookup keys to the groups until all of the lookup keys from the original training index 115 have been added to groups. The training module 110 then uses the reward function to generate a set of reward values to the groups and selects 612 a group of the set of groups based on the reward value.

Figure 7:
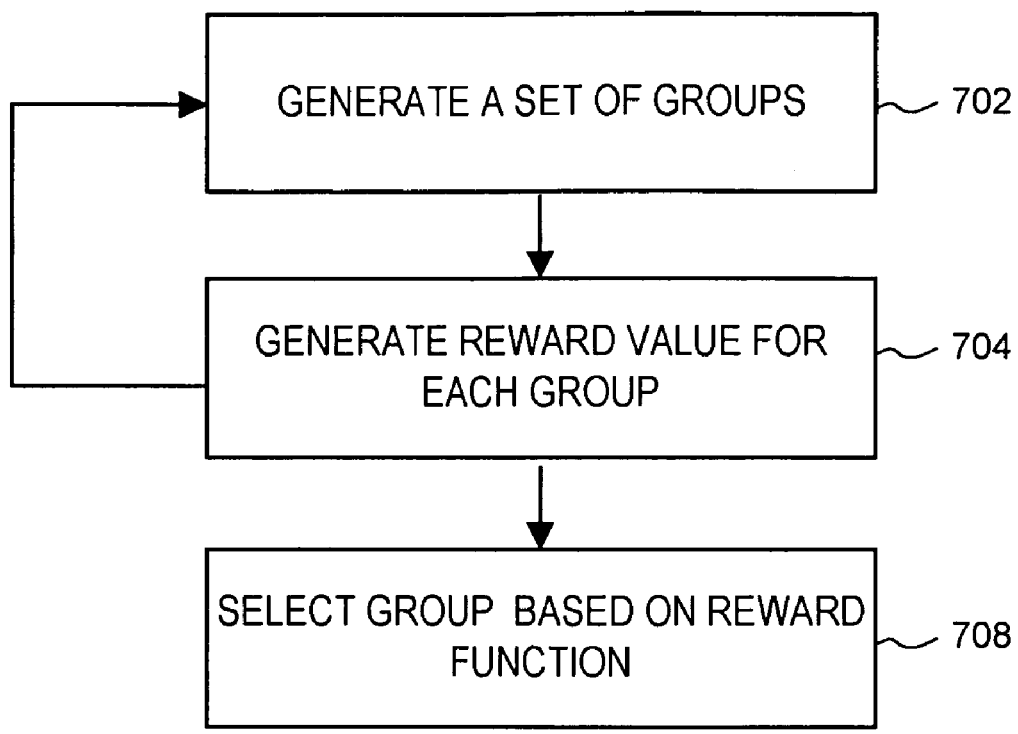
FIG. 7 illustrates detailed steps performed by the training module 110 to select a subset of lookup keys according to another embodiment.

FIG. 7 illustrates steps performed by the performed by the training module 110 to select a group of lookup keys based on the training index 115 to generate the reference index according to another embodiment. Other embodiments perform the illustrated steps in different orders, and/or perform different or additional steps. Moreover, some of the steps can be performed by engines or modules other than the training module 110.

The training module 110 generates 702 a set of groups based on the training index 115 according to a permutation function defined by the selection algorithm, wherein each set of groups contains one or more lookup keys stored in the training index. The training module 110 generates 704 a reward value for each group based on a reward function and the bins of reference identifier associated with the lookup keys in the training index 115. According to the embodiment, the reward function may evaluate a degree of inter-relatedness between the reference identifiers associated with the lookup keys in the group, an information value associated with the and/or a degree of clumping associate with the lookup keys in each group. For example, the reward value may indicate the occupancy associated with the lookup keys in the group, the probability metric associated with the lookup keys in the group, the entropy associated with the lookup keys in the group and/or the combined pair-wise mutual information of the lookup keys in the group. The training module 110 either selects 708 a group based on the reward value exceeding one or more pre-defined values or re-generates 702 a new set of groups containing different permutations of lookup keys based on the permutation function. In one embodiment, the permutation function is a randomized function which generates the set of groups by randomly selecting subsets of lookup keys.

Indexing of Reference Videos

Figure 8:
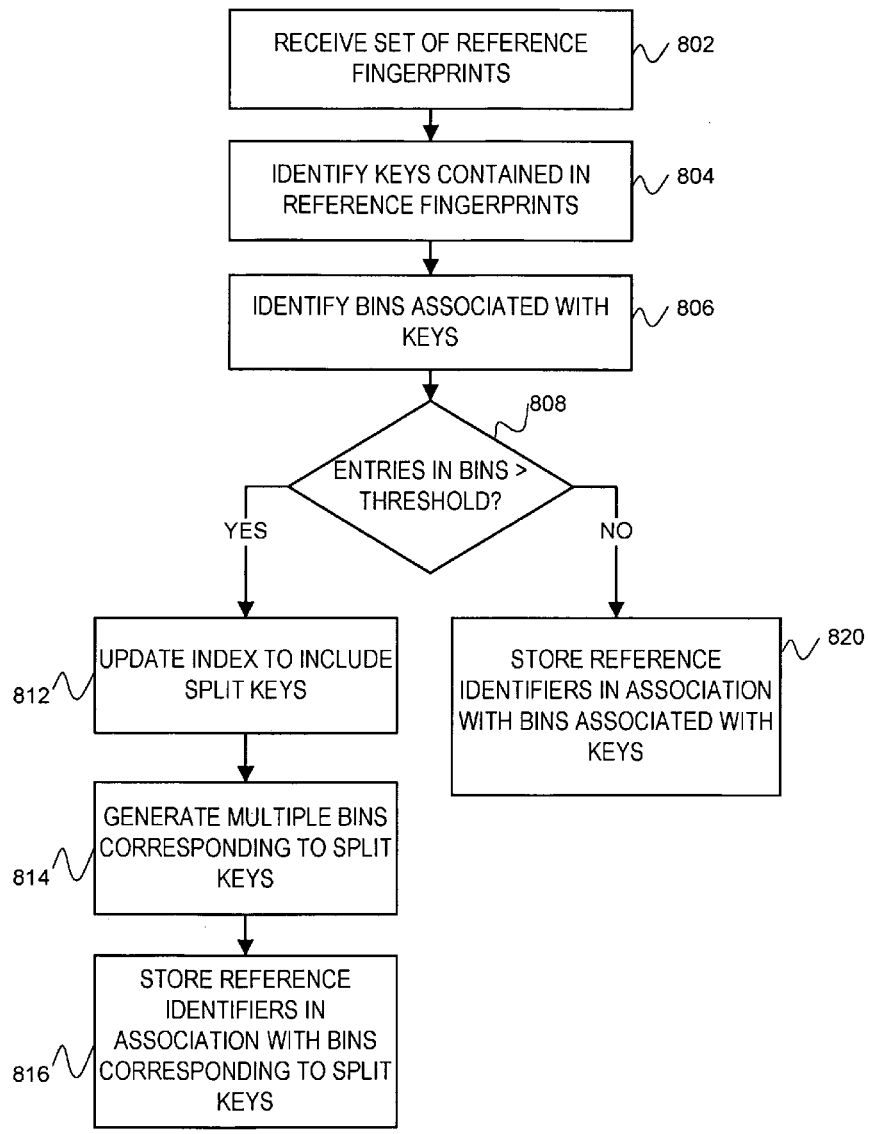
FIG. 8 illustrates steps performed by the indexing module 108 to receive and index reference videos 102 after the training module 110 has generated the reference index 120.

Once the training module 110 has generated the reference index and split lookup keys for the lookup keys that are likely to be associated with clumping, the indexing module 108 proceeds to index reference videos 102 in association the reference index 102, modifying the reference index as necessary to include the split lookup keys. FIG. 8 illustrates steps performed by the indexing module 108 to receive and index reference videos 102 after the training module 110 has generated the reference index 120. Other embodiments perform the illustrated steps in different orders, and/or perform different or additional steps. Moreover, some of the steps can be performed by engines or modules other than the indexing module 108.

The indexing module 108 receives 802 a set of reference fingerprints, each representing a time-localized segment from one or more reference videos. The indexing module 108 identifies 804 a set of lookup keys are that are contained within the set of reference fingerprints. The indexing module 108 identifies 806 bins in the training index 115 which store reference identifiers which represent the reference fingerprints the keys are contained in.

For each lookup key, the indexing module 108 determines 808 if adding a reference identifier representing one of the newly received reference fingerprints will cause the number of reference identifiers stored in the bin associated with the lookup key to exceed a pre-defined threshold representing the maximum number of reference identifiers. In other words, the indexing module 108 evaluates the number of reference identifiers associated with each lookup key in order to determine 808 whether "clumping" has occurred.

If the number of reference identifiers associated with the lookup key is determined 808 to exceed the threshold value, the indexing module 108 updates 812 the index to remove the lookup key and include split lookup keys associated with the lookup key and re-assigns previously stored reference identifiers associated with the lookup key to the bins associated with the split lookup keys. As described above, in one embodiment, split lookup key data for lookup keys associated with a high likelihood of clumping is stored in association with the reference index 120. In this embodiment, memory is allocated to store the split keys associated with lookup keys and their respective bins of reference identifiers during the reference index 120 generation. The indexing module 108 generates 814 multiple bins in the memory corresponding to the split lookup keys. In embodiments where memory has previously been allocated with for the split lookup keys, the indexing module 108 uses the allocated memory to generate 814 bins corresponding to the split lookup keys.

The indexing module 108 stores 820 the reference identifiers associated with the lookup keys in the multiple bins corresponding to the split lookup keys. If the number of reference identifiers associated with the lookup key is determined not to exceed the threshold value, the indexing module 108 stores the reference identifiers in the bins associated with the lookup keys.

Runtime Evaluation of Newly Input Videos

Figure 9:
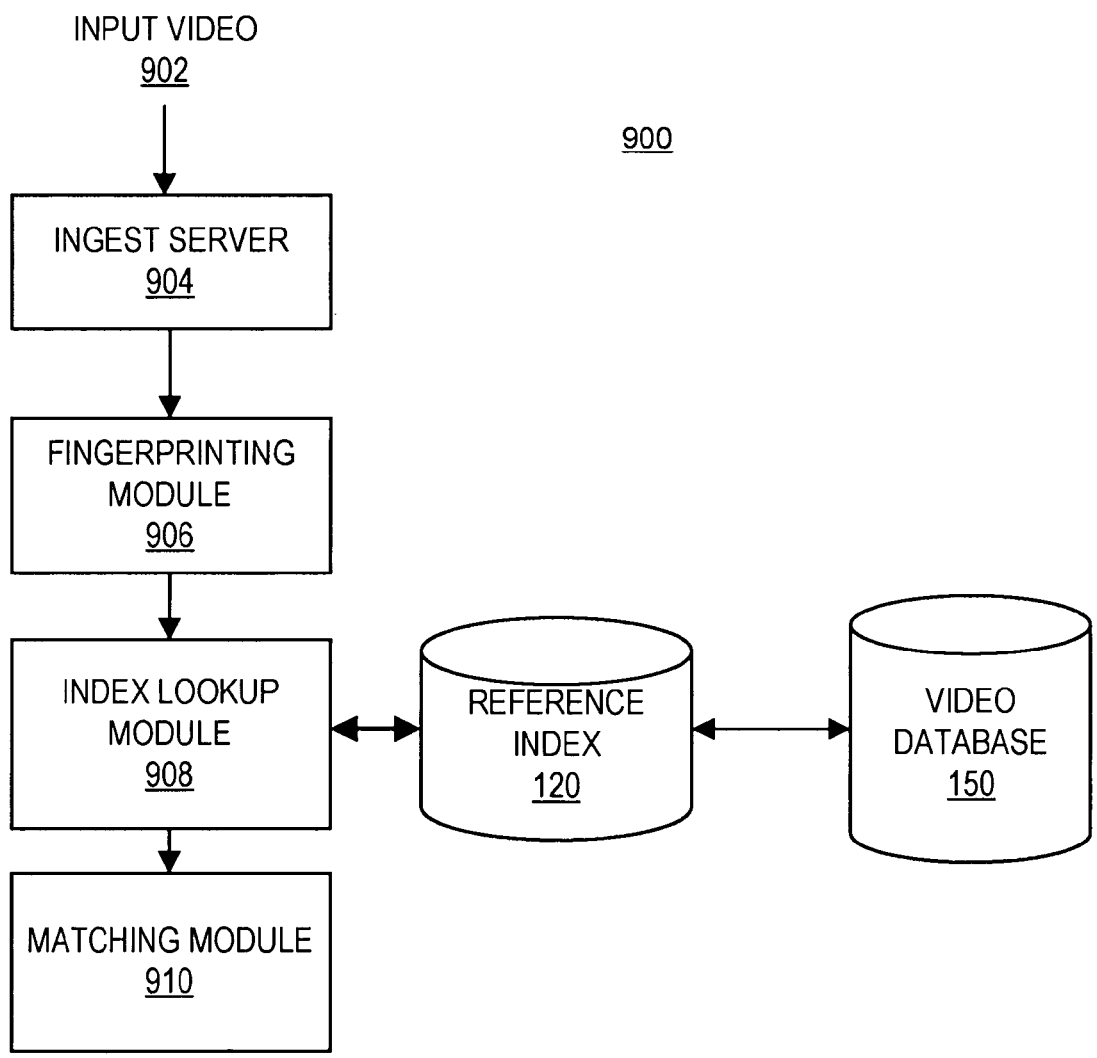
FIG. 9 illustrates an embodiment of a system for searching a reference video index according to one embodiment.

The reference index 120 created by the indexing module 108 can be used to efficiently determine whether a newly input video matches an existing reference video in the video database 150. By doing so, the system can detect input videos match reference videos belonging to rights holders, in instances where the reference index 120 is used to detect matches to videos associated with rights holders. FIG. 9 illustrates a system 900 for detecting matching video content by performing lookups on the reference index 120. The system comprises a memory which stores components including: an ingest server 9904, a fingerprinting module 906, an index lookup module 908, a matching module 910, a reference index 120 and a video database 150 and a processor which execute executable program code associated with the system components. An ingest server 904 receives an input video 902 for matching against videos indexed in the reference index 120. The reference index 120 is coupled to a video database 150 comprising the reference videos 102. In one embodiment, the ingest server 904 may be similar or identical to the ingest server 104 for receiving reference videos 102. A fingerprinting module 906 generates input fingerprints for the input video 802 using a fingerprinting process similar to that used to generate the reference fingerprints. An index lookup module 908 executes a lookup on the reference index 120 to retrieve a set of reference identifiers that have reference keys matching the input keys of the input fingerprint. Based on the results of the lookup, the matching module 910 determines a set of reference videos, or portions of reference videos, that match at least a portion of the input video.

In one embodiment, the matching module 910 matches the input video 902 to reference videos 102 based on the matches between input keys of the input fingerprint and reference keys of the reference videos stored in the reference index 120. In particular, a reference segment (identified by a reference identifier) may be considered a good candidate match to the input video 902 if there are multiple matches between reference keys in the reference fingerprint and input keys in the input fingerprint. Thus, in one embodiment, the matching module 910 identifies reference identifiers that are stored in bins for at least two different matching keys, and stores these as initial candidate references. As multiple matches are necessary in order to indentify a good candidate match, the minimization of clumping in the lookup keys enables the system to identify multiple matches without retrieving long lists of reference identifiers. The matching module 910 then further analyzes these initial candidate references to determine if the reference videos 102 associated with the candidate reference match the input video 902. In some embodiments, the matching module 910 retrieves the reference videos 102 associated with the candidate reference if the reference videos 102 are determined to match the input video 902.

The present invention has been described in particular detail with respect to a limited number of embodiments. Those of skill in the art will appreciate that the invention may additionally be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Furthermore, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of the above description present the feature of the present invention in terms of algorithms and symbolic representations of operations on information. These algorithmic descriptions and representations are the means used by those skilled in the art to most effectively convey the substance of their work to others skilled in the art. These operations, while described functionally or logically, are understood to be implemented by computer programs stored in a memory and executed by one or more processors. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

The invention claimed is:

1. A computer-implemented method for indexing a set of reference videos, the method executed by one or more computer systems and comprising:

receiving a set of training reference fingerprints based on a set of training reference videos, each training reference fingerprint comprising a sequence of fingerprint values representing a time localized portion of a training reference video from the set of training reference videos;

identifying a set of keys contained in the set of training reference fingerprints, each key comprising a subset of the fingerprint values;

selecting a subset of the set of keys based, in part, on a selection algorithm, wherein the selection algorithm evaluates a plurality of subsets of the set of keys based on a reward function, wherein the reward function quantifies, in part, an amount of clumping associated with each subset of the set of keys;

generating a reference index for indexing a set of reference videos based on the subset of keys;

and storing the reference index.

2. The method of claim 1, wherein selecting the subset of keys comprises:

selecting a key of the set of keys;

generating a set of reward values associated with the plurality of subsets of the set of keys based on the reward function, wherein each reward value represents an expected benefit associated with adding the selected key to a subset of keys;

and adding the selected key to a subset of keys of the plurality of subsets of keys based on the set of reward values, wherein the selected key is added to the subset of keys associated with a reward value that indicates a maximum benefit associated with adding the selected key to the subset of keys.

3. The method of claim 2, wherein selecting a subset of keys further comprises;

generating a plurality of reward values associated with the plurality of subsets of keys based, in part, on the reward function, wherein each of the plurality of reward values indicate, in part, an amount of clumping associated with a subset of keys;

and selecting the subset of keys of the plurality of subsets of keys associated with a reward value which indicates a minimum amount of clumping associated with the subset of keys.

4. The method of claim 1, wherein selecting the subset of keys comprises:

iteratively generating the plurality of subsets of keys according to a permutation function;

generating a plurality of selection values associated with the plurality of subsets of keys based, in part, on the reward function, wherein each of the plurality of values indicates, in part, a degree of clumping associated with a subset of keys;

and selecting the subset of keys of the plurality of subsets of keys associated with selection value which indicates a minimum amount of clumping associated with the subset of key.

5. The method of claim 1, further comprising:

generating a plurality of values associated with the subset of keys, wherein each value indicates an amount of clumping associated with a key;

identifying a key of the subset of key associated with a value of the plurality of values, the value indicating a large amount of clumping;

generating one or more split keys associated with the key, wherein the one or more split keys comprise the key and at least one additional fingerprint value;

and storing data indicating the one or more split keys.

6. The method of claim 5, wherein generating a reference index for indexing a set of reference videos based on the subset of keys comprises allocating memory associated with each key of the subset of keys and further comprising:

allocating memory associated with the one or more split keys.

7. The method of claim 5, further comprising:

receiving a set of reference fingerprints based on a reference video, each reference fingerprint comprising a sequence of fingerprint values representing a time localized portion of the reference video;

identifying a set of keys contained in the set of training reference fingerprints, each key comprising a subset of the fingerprint values;

identifying a set of bins associated with the set of keys based on the reference index, wherein each bin specifies a number of reference videos the key is associated with;

and modifying the reference index to include the one or more split keys associated with the lookup key responsive to determining that the number of reference videos the key is associated with exceeds a threshold value.

8. A non-transitory computer-readable storage medium encoded with executable computer program code for indexing a set of reference videos, the program code comprising program code for:

receiving a set of training reference fingerprints based on a set of training reference videos, each training reference fingerprint comprising a sequence of fingerprint values representing a time localized portion of a training reference video from the set of training reference videos;

identifying a set of keys contained in the set of training reference fingerprints, each key comprising a subset of the fingerprint values;

selecting a subset of the set of keys based, in part, on a selection algorithm, wherein the selection algorithm evaluates a plurality of subsets of the set of keys based on a reward function, wherein the reward function quantifies, in part, an amount of clumping associated with each subset of the set of keys;

generating a reference index for indexing a set of reference videos based on the subset of keys;

and storing the reference index.

9. The medium of claim 8, wherein program code for selecting the subset of keys comprises program code for:

selecting a key of the set of keys;

generating a set of reward values associated with the plurality of subsets of the set of keys based on the reward function, wherein each reward value represents an expected benefit associated with adding the selected key to a subset of keys;

and adding the selected key to a subset of keys of the plurality of subsets of keys based on the set of reward values, wherein the selected key is added to the subset of keys associated with a reward value that indicates a maximum benefit associated with adding the selected key to the subset of keys.

10. The medium of claim 9, wherein program code for selecting a subset of keys further comprises program code for:

generating a plurality of reward values associated with the plurality of subsets of keys based, in part, on the reward function, wherein each of the plurality of reward values indicate, in part, an amount of clumping associated with a subset of keys;

And selecting the subset of keys of the plurality of subsets of keys associated with a reward value which indicates a minimum amount of clumping associated with the subset of keys.

11. The medium of claim 9, wherein selecting the subset of keys comprises: iteratively generating the plurality of subsets of keys according to a permutation function;

generating a plurality of selection values associated with the plurality of subsets of keys based, in part, on the reward function, wherein each of the plurality of values indicates, in part, a degree of clumping associated with a subset of keys;

and selecting the subset of keys of the plurality of subsets of keys associated with selection value which indicates a minimum amount of clumping associated with the subset of key.

12. The medium of claim 9, further comprising:

generating a plurality of values associated with the subset of keys, wherein each value indicates an amount of clumping associated with a key;

identifying a key of the subset of key associated with a value of the plurality of values, the value indicating a large amount of clumping;

generating one or more split keys associated with the key, wherein the one or more split keys comprise the key and at least one additional fingerprint value; and storing data indicating the one or more split keys.

13. The medium of claim 12, wherein generating a reference index for indexing a set of reference videos based on the subset of keys comprises allocating memory associated with each key of the subset of keys and further comprising:

allocating memory associated with the one or more split keys.

14. The medium of claim 13, further comprising:

receiving a set of reference fingerprints based on a reference video, each reference fingerprint comprising a sequence of fingerprint values representing a time localized portion of the reference video;

identifying a set of keys contained in the set of training reference fingerprints, each key comprising a subset of the fingerprint values;

identifying a set of bins associated with the set of keys based on the reference index, wherein each bin specifies a number of reference videos the key is associated with;

and modifying the reference index to include the one or more split keys associated with the lookup key responsive to determining that the number of reference videos the key is associated with exceeds a threshold value.

15. A computer system for indexing a set of reference videos, the computer system comprising:

a memory;

a processor;

and a training module stored in the memory and executable by the processor to:

receive a set of training reference fingerprints based on a set of training reference videos, each training reference fingerprint comprising a sequence of fingerprint values representing a time localized portion of a training reference video from the set of training reference videos;

identify a set of keys contained in the set of training reference fingerprints, each key comprising a subset of the fingerprint values;

select a subset of the set of keys based, in part, on a selection algorithm, wherein the selection algorithm evaluates a plurality of subsets of the set of keys based on a reward function, wherein the reward function quantifies, in part, an amount of clumping associated with each subset of the set of keys;
generate a reference index for indexing a set of reference videos based on the subset of keys;
and store the reference index.

16. The computer system of claim 15, wherein the training module is further executable to:
select a key of the set of keys;
generate a set of reward values associated with the plurality of subsets of the set of keys based on the reward function, wherein each reward value represents an expected benefit associated with adding the selected key to a subset of keys;
and add the selected key to a subset of keys of the plurality of subsets of keys based on the set of reward values, wherein the selected key is added to the subset of keys associated with a reward value that indicates a maximum benefit associated with adding the selected key to the subset of keys.

17. The computer system of claim 16, wherein the training module is further executable to:
generate a plurality of reward values associated with the plurality of subsets of keys based, in part, on the reward function, wherein each of the plurality of reward values indicate, in part, an amount of clumping associated with a subset of keys;
and select the subset of keys of the plurality of subsets of keys associated with a reward value which indicates a minimum amount of clumping associated with the subset of keys.

18. The computer system of claim 15, wherein the training module is further executable to:
iteratively generate the plurality of subsets of keys according to a permutation function;
generate a plurality of selection values associated with the plurality of subsets of keys based, in part, on the reward function, wherein each of the plurality of values indicates, in part, a degree of clumping associated with a subset of keys;
and select the subset of keys of the plurality of subsets of keys associated with selection value which indicates a minimum amount of clumping associated with the subset of key.

19. The computer system of claim 15, wherein the training module is further executable to:
generate a plurality of values associated with the subset of keys, wherein each value indicates an amount of clumping associated with a key;
identify a key of the subset of key associated with a value of the plurality of values, the value indicating a large amount of clumping;
generate one or more split keys associated with the key, wherein the one or more split keys comprise the key and at least one additional fingerprint value; and store data indicating the one or more split keys.

20. The computer system of claim 19, wherein generating a reference index for indexing a set of reference videos based on the subset of keys comprises allocating memory associated with each key of the subset of keys and training module is further executable to:
allocate memory associated with the one or more split keys.

21. The computer system of claim 20, further comprising an indexing module stored in the memory and executable by the processor to:
receive a set of reference fingerprints based on a reference video, each reference fingerprint comprising a sequence of fingerprint values representing a time localized portion of the reference video;
identifying a set of keys contained in the set of training reference fingerprints, each key comprising a subset of the fingerprint values;
identifying a set of bins associated with the set of keys based on the reference index, wherein each bin specifies a number of reference videos the key is associated with;
and modifying the reference index to include the one or more split keys associated with the lookup key responsive to determining that the number of reference videos the key is associated with exceeds a threshold value.

* * * * *